United States Patent
Castaneda (10) Patent No.: US 11,192,056 B1
(45) Date of Patent: Dec. 7, 2021

(54) AUTOMATICALLY SCROLLING AIR FILTER

(71) Applicant: Kenneth Castaneda, Houston, TX (US)

(72) Inventor: Kenneth Castaneda, Houston, TX (US)

(*) Notice: Subject to any disclaimer, the term of this patent is extended or adjusted under 35 U.S.C. 154(b) by 196 days.

(21) Appl. No.: 15/971,947

(22) Filed: May 4, 2018

Related U.S. Application Data (60) Provisional application No. 62/501,715, filed on May 4, 2017.

(51) Int. Cl.
| | | |
|---|---|---|
| *B01D 46/16* | (2006.01) | |
| *B01D 46/46* | (2006.01) | |
| *B01D 46/42* | (2006.01) | |
| *F24F 13/28* | (2006.01) | |
| *F24F 11/39* | (2018.01) | |
| *B01D 46/00* | (2006.01) | |
| *F24F 8/108* | (2021.01) | |

(52) U.S. Cl.
CPC ......... *B01D 46/16* (2013.01); *B01D 46/0086* (2013.01); *B01D 46/429* (2013.01); *B01D 46/46* (2013.01); *F24F 8/108* (2021.01); *F24F 11/39* (2018.01); *F24F 13/28* (2013.01); *B01D 2265/06* (2013.01); *B01D 2279/50* (2013.01)

(58) Field of Classification Search
CPC ........ B01D 46/46; B01D 46/16; B01D 46/22; B01D 46/0086; B01D 46/429; B01D 2265/06; B01D 2279/50; F24F 11/39; F24F 13/28; F24F 8/10; F24F 8/108
See application file for complete search history.

(56) References Cited

U.S. PATENT DOCUMENTS

| | | | |
|---|---|---|---|
| 4,221,576 A | | 9/1980 | Phillips, Jr. |
| 4,604,114 A | | 8/1986 | Ward |
| 5,258,051 A | | 11/1993 | Anderson |
| 5,394,214 A | * | 2/1995 | Petruchik .............. G03B 17/02 55/351 |
| 5,925,155 A | | 7/1999 | Rodgers |
| 6,152,998 A | | 11/2000 | Taylor |
| 6,402,822 B1 | * | 6/2002 | Najm ................ B01D 46/0086 55/351 |
| 6,491,735 B2 | | 12/2002 | Najm |
| 6,632,269 B1 | | 10/2003 | Najm |
| 6,743,282 B2 | | 6/2004 | Najm |

(Continued)

OTHER PUBLICATIONS

Dayton Reliable Air Filter, Dyna-Tech AirFlow Products, Auto Roll & Automatic Roll Filters (2 sheets) http://reliablefilter.com/morelauto-roll-.

(Continued)

*Primary Examiner* — Robert Clemente
(74) *Attorney, Agent, or Firm* — Karen B. Tripp (57) ABSTRACT

Economical, easy to install and use, and disposable, air filter for an HVAC system. The filter is quasi-universal with respect to the size of the air intake vent over which it can be deployed, and it requires less frequent replacement of filter material than is common with typical throwaway (box-type) air filters. When replacement of filter material is needed, the replacement can be done with less or no direct handling of or exposure to the dirty filter material. In use, the filter maintains relatively consistent cleanliness of the filter material by automatic, periodic scrolling of the filter material to replenish the filtering surface.

20 Claims, 5 Drawing Sheets

(56) References Cited

U.S. PATENT DOCUMENTS

| | | | |
|---|---|---|---|
| 8,617,278 B2 * | 12/2013 | Sullivan | B01D 46/18 55/351 |
| 9,375,669 B2 * | 6/2016 | Spiegel | B01D 46/22 |
| 2004/0146437 A1 * | 7/2004 | Arts | F24F 3/16 422/186.07 |
| 2006/0102006 A1 * | 5/2006 | Powell | B01D 46/008 96/429 |

OTHER PUBLICATIONS

Air Filters Incorporated, Sure-Fit Auto Roll, (9 sheets) https://www.airfilterusa.com/commercial-industrial/air-filter-media/auto-roll-air-.

Glasfloss Automatic Roll Filters, (5 sheets) http://www.glasfloss.com/product-categories/automatic-roll-filters.

* cited by examiner

AUTOMATICALLY SCROLLING AIR FILTER

CROSS REFERENCE TO RELATED APPLICATION

This application claims priority from U.S. Provisional Patent Application Ser. No. 62/501,715, filed May 4, 2017, the entire contents of which are incorporated herein by reference.

STATEMENT REGARDING FEDERALLY SPONSORED RESEARCH OR DEVELOPMENT

This invention is not the result of federally sponsored research.

REFERENCE TO SEQUENCE LISTING, A TABLE, OR A COMPUTER PROGRAM LISTING, OR A COMPACT DISK APPENDIX

None

BACKGROUND

1. Field of the Invention

The invention relates to heating, ventilation and air conditioning (HVAC) systems, and particularly to air filters associated therewith.

2. Description of Relevant Art

Central air systems for houses and apartments require filters to capture and prevent particles (dust, pollen, dirt, etc.) from entering the central air systems and collecting on blower fans and coils. Filters also clean up the air for the comfort of those living in the house. As the filters collect the particles, the filters get dirty and clogged. This makes them less effective in capturing the particles and begins to put strain on the motors in moving the air through, causing more electricity demand for the motors. Regular, routine filter changes are recommended and the schedule (between monthly to semi-annually) is based on the type of filter installed. It's an additional task for a homeowner, renter, or landlord to keep track of in their lives/operations.

Central air systems typically have air filters located at an air intake vent on a wall or ceiling, and sometimes the air filters can be located at an air unit near the blower. When located at the air intake vent, there will typically be a space for the filter to sit just behind the vent. This space will have a set dimension which drives the size filter to be placed in it. The vent can be removed to access the space by removing screws or other fastening mechanisms (like little levers). The air filter can be comprised of filter material that is fiberglass, plastic fibers, fabric, paper, or metal. Fiberglass filters tend to require monthly changes (very frequent) and are the least expensive. They tend to have a low Merv rating, meaning the air can easily move through them and allow a relatively large percentage of the particles to pass through.

Fabric/paper filters are usually folded or pleated like an accordion to have more surface area to collect for longer periods. Typically they require changes every two to three months. They have higher Merv ratings than fiberglass filters and are more expensive. The tighter or more closely woven the paper, the higher the Merv rating, the more particles they capture, but also more energy at the motor is required to draw the air through the filter. The folds can be deeper (bigger peaks and valleys), such as HEPA rated filters. This allows them to have enough surface area to last up to about six months but these type of filters tend to be the most expensive option and require a modified housing/space to hold the thicker filter. This leads to a higher cost for the filter itself and the energy to operate the unit, with not much more of a time reduction in changing frequency.

Metal filters are reusable and can be washed on a monthly basis. Some air handling units have sensors to detect when a metal filter needs to be changed but the indicator is at the central unit, requiring the homeowner to enter the space (attic, basement, etc.) to see that the filter needs to be changed (as might be signaled, e.g., via an LED indicator). Metal filters are an initial higher cost, but can be less expensive in the long run since they only require water to wash. They typically have a lower Merv rating and don't capture all the particles, like the fiberglass or HEPA filters. Note: for manufacturing/industrial/commercial applications, air filters can come in all types of media, sizes, and costs (e.g. filtering toxic chemicals or keeping a clean room spotless).

Most air filters for residential use, however, are the throwaway kind, rather than the washable kind, and are comprised essentially of filter medium within a box type cardboard frame, sized to fit the space behind a particular air intake vent of the particular HVAC system. The sizes of filters vary greatly, however, to fit the many different sizes of spaces for the filters behind the air intake vents. In all, there seem to be hundreds of possible sizes, and while the numbers can be practically reduced down to some standard sizes, there are still over two dozen standard sizes. Finding and keeping the correct size filter for one's house or apartment can be frustrating and time consuming. A need exists for an economical, easy to install and use, disposable, air filter or air filtering mechanism for an HVAC system, that is not determined by the size of the space behind the air intake vent, and that requires less frequent replacement than is common with or typical of throwaway HVAC air filters.

SUMMARY

According to one aspect of the present invention, there is provided a quasi-universal, disposable, automatically scrolling air filter for an HVAC system. The air filter is designed to work with or cover an air intake vent or similar air intake opening of the HVAC system without need for removal of the vent cover.

The air filter of the invention has a roll of filter material on a dispensing roller spaced apart from a parallel and corresponding receiving roller having a power source associated with it. The filter material is connected to the receiving roller as well as the dispensing roller. The power source, such as a battery, causes the receiving roller to turn, pulling the filter material from the dispensing roller to the receiving roller. The filter material in the space between the rollers overlies the air intake vent or opening where it filters air entering the air intake vent. When that portion of the filter material becomes clogged with particles or has an undesirable quantity of particles accumulated so that the air particles are slowing passage of air through the filter, or at a pre-set time, the power source causes the filter material to scroll, replenishing the filter material overlying the air intake vent or other opening in the HVAC system.

DETAILED DESCRIPTION

The present invention provides an economical, easy to install and use, disposable, air filter for an HVAC system, that is usable with a wide range of sizes of air intake vents, and that requires less frequent replacement than is common with or typical of throwaway HVAC box-type air filters. Moreover, when replacement of the air filter of the invention is needed, the replacement can be done with less or no direct handling of a dirty filter.

Figure 1:
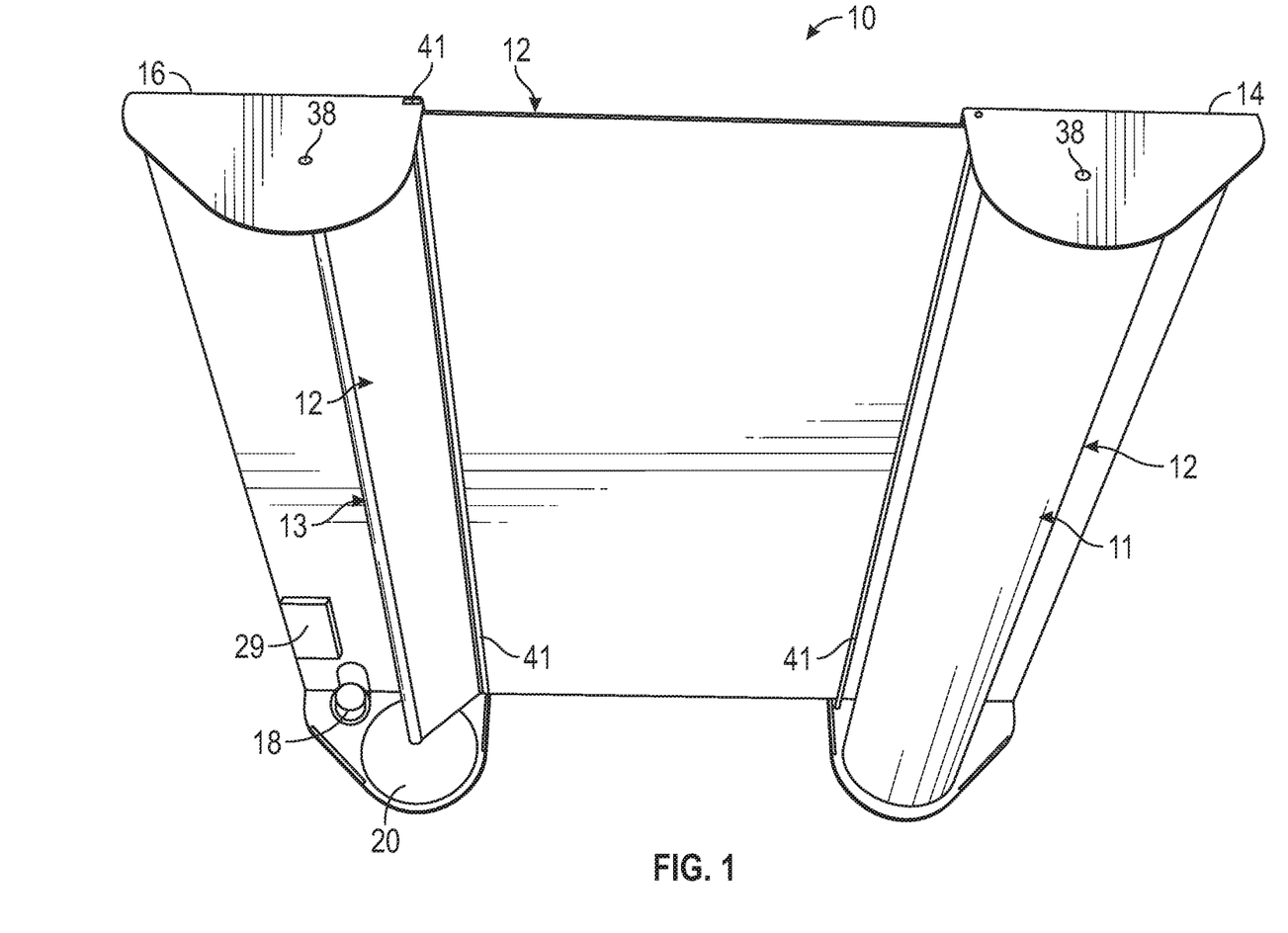
FIG. 1 provides a perspective top view of one embodiment of the air filter of the present invention, without a cover.
Figure 2:
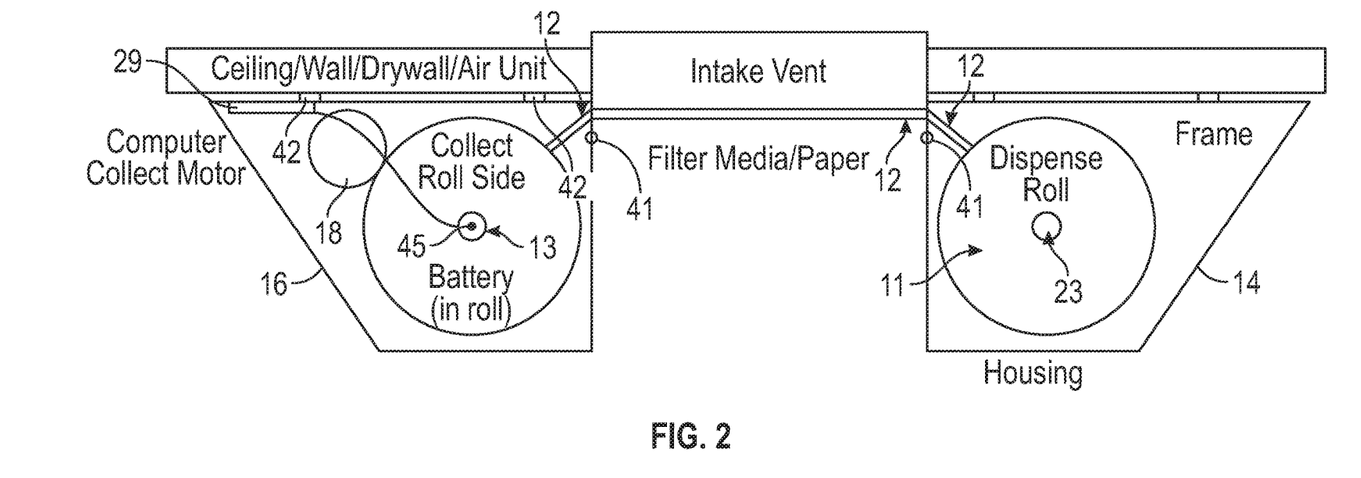
FIG. 2 provides an end view of the FIG. 1 embodiment of the air filter of the present invention, with the end portion of the housing removed for viewing of the roll of filter material on the dispensing and receiving rollers and to provide a schematic of the operation of the filter.
Figure 3:
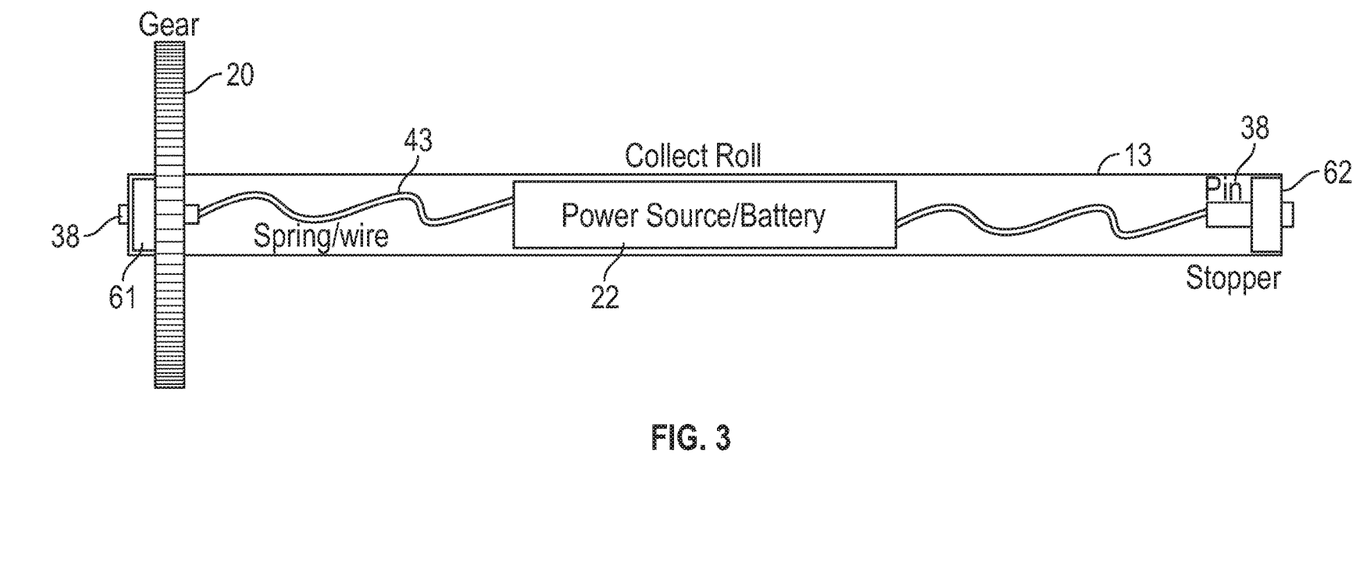
FIG. 3 provides a close-up interior or cutaway view of the receiving roller, showing the power mechanism, of the FIG. 1 embodiment of the air filter of the present invention.

Referring now to the drawings, FIGS. 1, 2, and 3 show one embodiment of an air filter 10 of the present invention. This embodiment of the air filter of the invention uses a roll 11 of filter media or material 12 wrapped or wound around a rollable or scrollable dispensing roller 23 for dispensing the filter material 12, to a rollable or scrollable receiving roller 13 for receiving the filter material 12. A motor 18 powered by a dry cell battery 22 (such as, for example, a AA or AAA battery) turns a gear 20 to move or turn the receiving roller 13. The turning of the receiving roller 13 pulls the filter material 12 from the dispensing roller 23, which causes the dispensing roller 23 to move or rotate to dispense filter material 12.

A housing 14 for the roll 11 on the dispensing roller 23 and a housing 16 for the receiving roller 13 hold the rollers 23 and 13 parallel to each other and opposite each other with a space in between the rollers 23 and 13, which the filter material 12 extends across in scrolling from the dispensing roller 23 to the receiving roller 13. In use, as will be further discussed below, this space over which the filter material 12 is extended between the rollers 23 and 13 is positioned over the air intake vent (or opening) to filter air entering the HVAC system. When this portion of the filter material becomes dirty or clogged, the dirty portion is scrolled onto the receiving roller 13 and clean filter material is scrolled from the dispensing roller 23 to provide clean filter material extending across the space between the rollers 23 and 13 and in front of the air intake vent (or opening).

Since the filter material 12 is provided as a roll 11 rather than a single, separate piece in a frame as typical in box-type throwaway filters, the filter of the invention is capable of lasting longer than typical box-type throwaway filters, and all the while, providing the ability to use a clean or more substantially clean filter throughout the life of the filter than is common for box-type throwaway filters. That is, the filter of the invention lasts a longer period of time than the monthly to semi-annually period typical of box type filters, with the life of the filter of the invention determined by the size of the roll 11—how much filter material 12 is on the dispensing roller 23, and how often the dispensing and receiving rollers are scrolled to replace the filter material extending across the space between those rollers.

Figure 4:
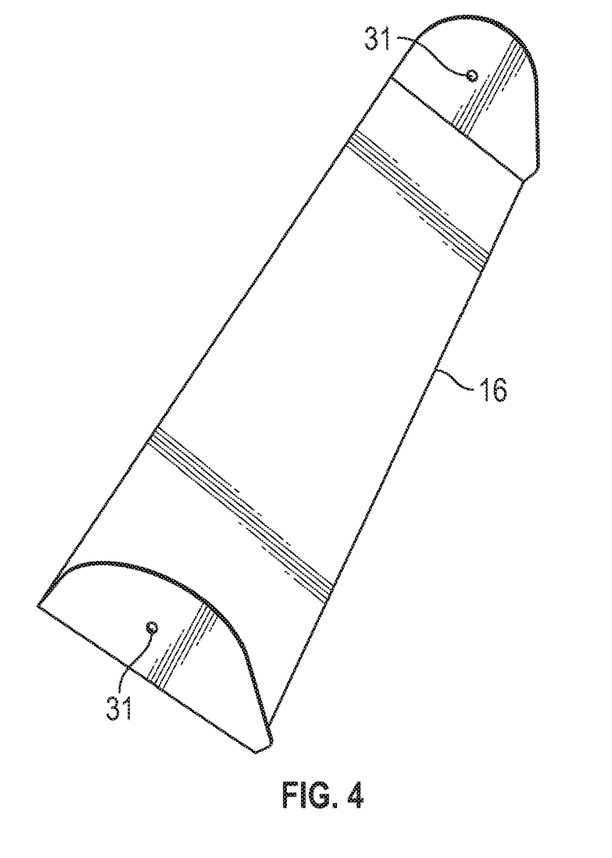
FIG. 4 provides a view of one embodiment of a bare housing or frame for a receiving (or dispensing) roller for example of the air filter of the present invention.
Figure 5:
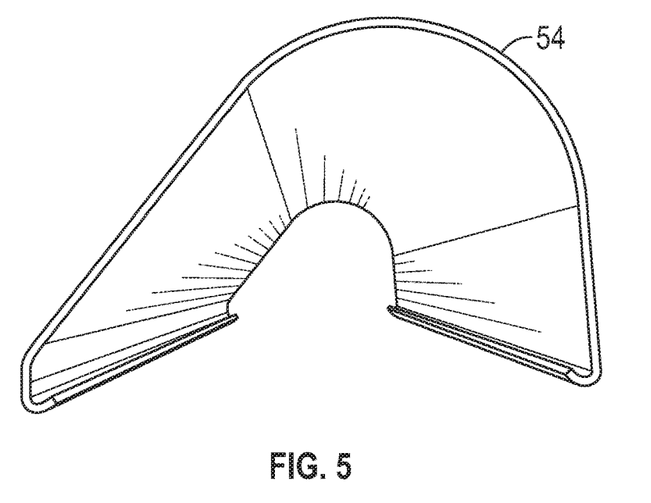
FIG. 5 provides an example embodiment of a bare housing or frame for a receiving or dispensing roller of one embodiment of the air filter of the present invention.

In one embodiment of the filter of the present invention as shown in FIGS. 2 and 3, receiving roller 13 houses a power source (e.g., one or more batteries 22, such as, for example, dry cell batteries), which provides power to a motor 18 which turns gear 20 which turns or rotates roller 13. The power source also has a relationship to pins 38 (generally positioned at the two ends 61 and 62 respectively of the roller 13) which fit in or connect to receiver holes 31 (FIG. 4) at the respective ends of the frame or housing 16, to keep the roller 13 in place. The pins 38 pass power from the power source (battery 22) housed in the roller 13 to computer electronics 29 or other controller housed in the frame or housing 16.

This dual purpose of the pins 38 (securing and power transfer) makes the roller 13 containing dirty/spent filter material easy to change when it comes time (that is, when the cartridge/roll is spent), and is a key convenience for maintaining the filter of the invention (e.g., similar to changing a toilet paper roll).

In one embodiment, one or more batteries 22 are located in the hollowed axle of the collecting roll 13. The battery or batteries 22 contain enough energy to scroll the entire roll 11 from the dispensing roller 23 to the collecting or receiving roller 13, and also to do any other actions requiring computation/power from the computer electronics 29 (e.g., light an LED indicator, send a signal to a phone or receiver). The computer electronics 29 is typically a control chip, programed to direct the timing of the scrolling of the receiving roller 13 and optionally the dispensing roller 23 as well.

In one embodiment, the battery or batteries 22 distribute power when locked into the hollowed axle or interior of the receiving roller 13 of the filter of the invention, as shown in FIG. 3, and the receiving roller 13 is in turn locked into the housing 16 through connection of the pins 38 to the housing 16 connection or axle holes 31. The pins 38 have a spring action, for example, such as or similar to the spring action of length adjusters for crutches. They are easy enough for a person to push but strong enough to keep a cartridge comprising the receiving roller and battery or batteries and roll of filter material, or a cartridge comprising the dispensing roller and a roll of filter material, in place during the lifespan of the roll of filter material. The springs (or spring-wire 43) are in contact with the ends of the power source (or battery 22) and the pins 38, transferring the power from the power source to the pins 38. The springs can be of varied assembly: wires hooked to bent metal, accordion shape, etc., as long as they provide force out to the pins and bring power from the batteries to the pins. Conductive contacts and wires are positioned at the axle holes 31 on the frame or housing 16 to transfer electricity to the computer electronics (such as a control chip) 29 from the pins 38.

In one embodiment of the filter of the invention, housing 16 and housing 14 are connected only indirectly through extension of the filter medium 12 from the dispensing roller in housing 14 to the receiving roller in housing 16 and are otherwise independent. In an alternative embodiment of the filter of the invention, housing 16 (or 48) and housing 14 (or 49) are also connected or in communication at least electronically for electrical control and coordination of the scrolling of both rollers.

In one embodiment, the filter of the invention scrolls filter material (e.g. fabric/paper) automatically and efficiently by using a timer (which can be located or programmed for example in the computer electronics 29, such as, for example, in a control chip) to calculate a sufficient lapsed time, in communication with one or more motors 18, to cause the filter to scroll the filter material from the dispensing roller to a new (clean) section in the space between the rollers. The dirty media section is rolled up on the collecting or receiving roller. In one embodiment, the power source 22 also provides power to a timer. In another embodiment, the timer includes its own power source.

In an alternative embodiment, the filter of the invention can have a sensor to detect when the filter material in the space between the rollers is dirty or clogged with particles and needs to be refreshed, that is, needs to be scrolled to the receiving roller and replaced with fresh/clean filter material scrolled from the dispensing roller. Such sensor would then communicate with the computer electronics 29, such as, for example, a control chip, for causing the one or more motor(s) 18 and gear(s) 20 to cause the filter to scroll the filter material.

In one embodiment, a manual activator such as, for example, a button (or mechanical indicator to signal the computer electronics 29) is positioned on the housing of the air filter of the invention for a person to push actuating the motor to roll the filter material to a new segment at their choosing. For example, the user may have had a particularly dirty environment for a period of time and thus wants to collect the dirty segment of filter material outside of any pre-set schedule. In one embodiment, this activation feature is controlled wirelessly via another electronic device, (e.g. smart phone, remote, smart thermostat, etc.), through WiFi, Bluetooth, RF (radio frequency) or the like. In still another embodiment, the computer electronics 29 is at least partially off-site or otherwise physically removed or distant from the motor 18 and the computer electronics 29 controls the motor 18 through WiFi, Bluetooth, RF, or the like. In such embodiments employing wireless communications, the air filter of the invention would also have a wireless transmitter/receiver to facilitate those communications included in the computer electronics 29.

In one embodiment, an LED or digital signal indicates the roll 11 is near exhaustion or another status (e.g. 50% through). The roll status is determined by the computer timer, in one embodiment. In another, the status is determined by indicators or switches (such as metal contacts) embedded on the filter material. In one embodiment, printed text or symbols show the status on the filter material. It becomes visible once the filter material is exposed in the cross section (e.g. "Order a new filter at website" or a QR code).

The receiving roller has a gear 20 connected to a gear on the motor 18 to pull in the used (dirty) filter material 12 from the dispensing roller (note: the drive train can alternatively be a belt, chain, rubber-band, etc.). By having the filter material 12 rolled up or in a roll 11, a long length of filter material can be employed to last longer and require less replacement/maintenance than a traditional or prior art air filter. For example, instead of changing air filters in a home every quarter, a homeowner can change the roll 11 of the filter of the invention every one to two years. In embodiments of the invention where the power source is one or more batteries located inside the interior or hollowed axle of the receiving roll, the battery lasts the entire time it takes for the roll of filter material to scroll in use according to the invention from the dispensing roller to the receiving roller. In such embodiments, roller 13 containing a new battery 22 is replaced when roll 11 of filter material is replaced. The spent roller is disposed of, containing the spent roll 11 and the spent battery 22, and in some embodiments, the housing 16 for the spent roller is also disposable and replaceable, so the human user never has to see or touch the spent (dirty) roll 11. In these embodiments, the human user will need to connect the new roll 11 (purchased on a new roller 23 or placed on the existing roller 23) by dispensing some filter material 12 to connect to new roller 13 and the user will need to attach such filter material 12 to that new roller 13 so the scrolling according to the invention can begin.

The filter of the invention is thus an automatically scrolling air filter which advantageously requires fewer filter changes to be done by a human (i.e. less changes on an annual basis) and which can be coupled with known digital features, such as automated ordering or email reminders, to increase convenience.

As the receiving roller 13 increases in diameter (due to collecting or receiving dirty filter material), the timer or control chip adjusts to control the motor 18 to be on or activated for shorter periods of time, due to the mechanics of the rolling in relation to the growing radius of the collecting or receiving roller 13.

Optionally, the filter of the invention can include guides 41 to help guide the filter material 12 from the dispensing roller 23, across the space between the rollers 11 and 13, to the receiving roller 13. In the embodiment shown in FIGS. 1 and 2, the guides 41 are mechanical guides to help with feeding the filter material 12. These guides 41 also help keep the filter material 12 taut and in-place when the filter is installed for use with the HVAC system. In one embodiment, the guides comprise a pole held by magnets to support the filter paper as it spans the vent. Vents are typically made out of sheet metal and thus the magnets are attracted to the vents when the filter overlays a vent covering an air intake space. The pole thus acts as a guide and support for the filter materials.

The housing 14 and housing 16 also help keep the filter material 12 in place and pressed so as to have the filter material running close to the face of the vent intake when installed for use with the HVAC system. There can be internal mechanisms or holders or positioners in the frame or housing 16 (for the receiving roller) that help guide the filter material 12 being received or collected around the axle/roller 13.

Figure 6:
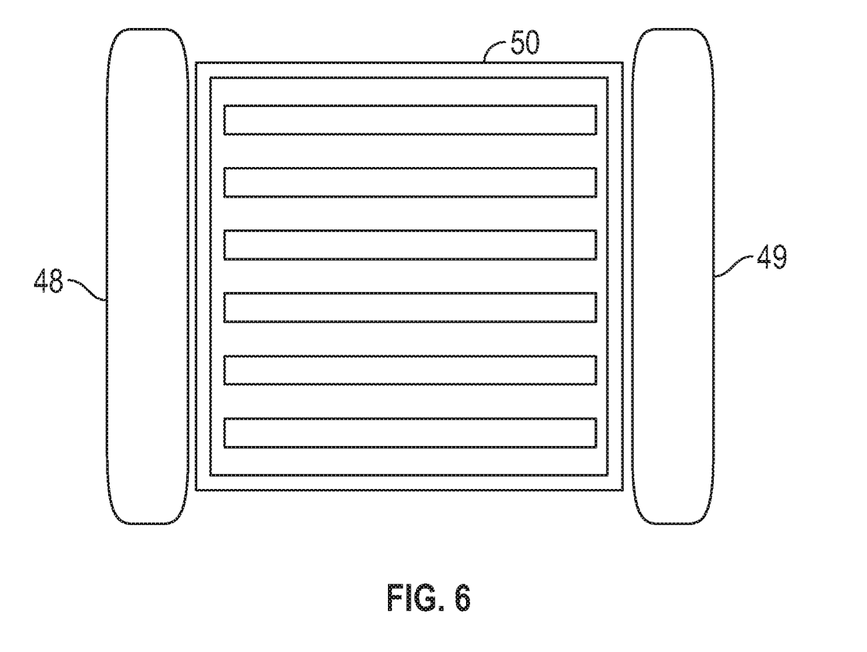
FIG. 6 provides an alternative embodiment of the air filter of the present invention, with a vented cover.

In the embodiment of the air filter of the invention shown in FIG. 6, the vented cover 50, that fits between the collector and dispenser housings and over the space between these housings, sandwiches the underlying filter material 12, pressing it against the existing HVAC vent intake, when the filter is installed over that vent intake. The vented cover 50 allows air to pass through to the underlying HVAC vent, and acts as an aesthetic improvement piece to hide the filter material 12. In one embodiment, there is an optional bar to magnetically attach to the vent to help guide filter material across the span across the HVAC vent. This may be needed for large spans. In an alternative embodiment, the underlying HVAC vent is removed.

An advantage of the present invention is the ability of the filter material 12 to span varying sizes of such existing HVAC vent intake locations. Particularly where the filter of the invention has independent housing for the dispensing roller and the receiving roller, the space between the rollers may be easily adjusted by the user by simply positioning the rollers on opposing sides of the HVAC vent intake space, however wide or narrow that space might be. The filter material 12 may then be scrolled out to cover that space. The computer electronics 29, such as, for example, a control chip, can adjust timing for scrolling so the entire space is refreshed with clean filter material as needed to accommodate the different sized spaces. This advantage of the filter of the invention makes the filter quasi-universal, at least with respect to the width of the HVAC intake opening. The height of the HVAC intake openings vary as well as their widths for various HVAC systems, however, and thus one size filter of the invention may at times not be of sufficient height to completely cover all such openings at their top and/or bottom. Hence, it is contemplated that the filter of the invention will be made available in several sizes but significantly fewer will be needed than with throwaway box type filters of the prior art.

The filter of the invention advantageously installs easily over existing HVAC air intake openings in walls/ceilings, where common or typical prior art throwaway box type air filters have been commonly used and accessed. In one embodiment, the filter of the invention lies over or is positioned atop the HVAC intake vent, resulting in the filter being visible in the house once installed. Some air intake vents have large spaces in the ceiling/wall, and in some such cases, that is, in one embodiment, the filter of the invention can be installed in this space, behind the visible vent. Some air units allow the filter of the invention to be positioned so that the individual housing of the rollers can be respectively installed on the two sides of the unit allowing the filter to pass over the sides and the air intake opening; this is common for apartment complex units located in closets.

Optimally, the filter of the invention is installed in pieces. That is, the dispensing roller 23 with roll 11 of filter material 12 is attached via attachers such as, for example, magnets, screws, adhesive or clips to one side of a vent overlaying an air intake duct of a HVAC system or over another opening of such an air intake duct. The receiving (or collecting) roller 13 is positioned parallel to and opposite from the dispensing roller 23 and is attached via similar or the same type attachers such as, for example, magnets, screws, adhesive or clips to the opposing side of the vent or other opening of the air intake duct. These individual respective rollers may be, in one embodiment, individually and separately housed in respective housing—housing 14 for roller 23 and housing 16 for roller 13, and the attachers attach the housings to the sides of the vent or air intake duct opening (rather than directly attaching the rollers to the sides of the vent or air intake duct opening). Such housings, and such rollers, however, are separate from one another, even though they may be in communication through pins or through the filter materials or even through an attached connector. The housings and rollers may each independently be replaced in one embodiment, and in an alternative embodiment, one roller with housing may independently be replaced with another roller with housing, even when the rollers are not themselves replaceable without the housing for that roller.

Having the receiving roller replaceable independent of the dispensing roller and similarly thus installable independently, that is, having the receiving roller and the dispensing roller separate pieces (with or without a cover or accompanying housing), provides a critical advantage of the present invention. That is, the dispensing roller and the receiving roller may be installed as far apart as needed to cover the HVAC air input vent or other opening, leading to the quasi-universal use of the filter—that is—enabling one size of the filter to be useful for a wide variety of different sized openings. Any difference in size of the filters of the invention thus need only be in the quantity of filter material on the dispensing roll and the height of the filter.

Also, this separateness of parts, this separateness of the rollers, eases replacement of the parts, as discussed above. Thus, the spent receiving roller 13 with spent battery and spent roll 11 of filter material 12 may be removed and disposed of without having to remount or reattach the housing 16 for the receiving roller 13 or the housing 14 for the dispensing roller 23. If it is desired not to have to touch the spent (dirty) roll 11, then an embodiment of the invention could be used where the housing 16 for the receiving roller 23 could be disposed of with the spent roll 11, but again, this removal would still be independent of having to remove and remount or reattach the housing for the dispensing roll. The dispensing roller 23 could be replenished with a new roll 11 of filter material by simply removing an empty roller 23 and replacing it with a new roller 23 holding a new roll 11. Also as noted above, in an embodiment where the power source, such as one or more batteries, is in a hollowed-out interior of the receiving roller 13, replacement of roller 13 also results in replacement and replenishment of that power source.

The embodiment of the filter of the invention shown in FIG. 6 is also comprised of individual parts. That is, the dispensing roller and housing 49 is separate from the receiving roller and housing 48 and both are independent from the cover 50. That is, the cover 50, an optional vented or porous disguise and/or protector for the filter material spanning the space between the two rollers, is designed to come in a wide variety of widths to adapt the filter for different width air intake vents or other openings in the HVAC. Thus cover 50 may be selected and used for a particular air intake space, but also with the dispensing roller and housing 49 and receiving roller and housing 48, which are quasi-universal in size for many different spaces. This flexibility of the filter of the invention further expands its usefulness and advantages over prior art filters.

Further, the pins 38 which hold the dispensing and receiving rollers 23 and 13 in place in their respective housings 14 and 16 as discussed above, and those housings with guides 41 which hold and guide the scrolling of the filter material 12 between the rollers 23 and 13 and across the space between the rollers 23 and 13, contribute further to the ease of use of the filter of the invention as well as its reduced cost, its overall marketplace advantage, and the advancement in the art that the invention makes.

For simplicity of design, to aid ease of use and reduce costs, the housing of the filter of the invention can be attached to or installed over an HVAC air intake vent or duct using double sided sticky tape, magnets, screws, or similar, readily available, and easy-to-use attachers. The filter of the invention is lightweight, allowing for simple hardware to secure it in place for operation and use. For filters located inside an HVAC air handling unit, the filter housing will need to be installed to move the filter material through the section, as discussed above.

The roll 11 of filter material 12 of the filter of the invention has optional features that can enhance the utility of the filter of the invention. In one embodiment, the roll 11 of filter material 12 has scent freshener embedded within it or on it for improving the smell of the house in which the filter is used. This scent is typically applied during manufacturing the cartridge or by the supplier of the filter material. For example, in one embodiment, scented twine is run along the filter and spooled with the filter material when manufacturing. In another embodiment, the spool is soaked in fragrance prior to spooling. In still another embodiment, scent is sprayed onto the paper as it is wound during manufacturing. In another embodiment, the roll 11 of filter material 12 has a static charge to improve dust-capturing capabilities. In another embodiment, the roll 11 of filter material 12 is unscented.

The filter of the invention of the invention provides further advantages for homeowners, landlords, and tenants over known, commercially available, prior art air filters, and even over known disclosures of air filters that have the filter material on a roll and have scrolling features for replenishment of the filter such as taught in: U.S. Patent Application Publication No. 2006/0102006 of Powell, published May 18, 2006; U.S. Pat. No. 6,743,282 B2 of Najm, issued Jun. 1, 2004; and U.S. Pat. No. 5,925,155 of Rodgers, issued Jul. 20, 1999.

Using the filter of the present invention with an HVAC system, air flowing to the air handler of the HVAC system can be consistently clean, thereby reducing airborne particles in the house for comfort, reducing particle collection on fans and coils which can lead to failure, and reducing energy demand from the motor(s) to move the air through clogged filters. By its simple design of hardware and system, the filter of the present invention is low in cost and competitive when compared to a year's worth of typical prior art air throwaway box type filters. Further, once the initial hardware of the present invention is purchased and installed, the replacement roll of filter material, or replacement cartridge including a replacement roll of filter material and a roller with a battery inside, for example, will be lower in price than known air filters. That is, not only will the replacement not be needed for at least a year or two, but the roll of filter material itself will be less expensive than typical box type throwaway filters because the filter roll of the invention does not require the manufacturing process/materials today's known box type throwaway filters require (folding, wire, cardboard frame). And as previously indicated, ordering the right size filter roll is more convenient for the filter of the present invention since the filter of the present invention only requires knowledge of one dimension (recommend the longer dimension), meaning, for example, a filter of the present invention to cover a 24×12 air input vent or space will have the same hardware and filter material or filter material cartridge (roll with roller) as a 24×16 air input vent or space. Thus, stocking the filter of the invention for distribution by vendors or by users for use is simpler. There is no need to worry about hard wiring or battery charging with embodiments of the invention where the replacement rollers, at least replacement receiving rollers, contain new batteries.

Maintaining consistent replenishment of fresh filter material according to the present invention saves money by keeping demand for electricity down. An HVAC system operates more efficiently, using less electricity, when air flows easily through it, which air does when the air filter material is clean and not clogged with an accumulation of air particles on the filter material. Households that neglect or procrastinate regular air filter replacement and consequently have and keep dirty throwaway box-type air filters will especially benefit from energy savings with use of the filter of the present invention. According to the United States Department of Energy, clogged air filters increase energy consumption of an HVAC system by 5-15%. And clogged air filters are known in the industry as the prime cause of heating and cooling system malfunctions.

The HVAC system is a crucial aspect of living comfort, and should not be compromised by the air filter. The filter of the present invention does not require for use any alteration of the designed inputs and outputs of an existing HVAC system, and none of the HVAC system's ducts are cut or necessarily entered for installation of the filter. Furthermore, the filter of the invention can use already known filter materials, which are already accepted as sufficient for filtering air particles in an HVAC system, and providing at least equivalent or better results than commonly used throwaway box-type filters, including maintaining proper filtration capabilities, mass air flow requirements, and efficient energy consumption. Any such known filter material, including for example without limitation fiberglass, plastic fibers, fabric, paper, or metal, may be used with the invention provided the material is scrollable and has enough tensile strength to withstand pulling and scrolling of the rollers as described above. In its simplest, least expensive form, the filter of the present invention captures dust and lint and meets MERV standards of at least 6. With more expensive and/or more complex filter materials, the filter of the present invention can filter multiple types of airborne particles—pollen, pet dander, bacteria, and viruses, as well as dust and lint.

The housing can be aesthetically pleasing. In one embodiment, colors/textures similar to common HVAC vents are used. This approach can help in marketing the integration of the filter of the invention into an HVAC system. In another embodiment, consideration that dust can cause discoloration (commonly gray tones) in taken into account in determining the filter material color. Printed patterns or physical screening can reduce the visual discomfort/disgust caused from dust/coloring the filter material.

Generally in manufacturing the filter of the invention, filter material is selected from various materials known to have filtering capabilities, including natural and synthetic papers and fabrics, and porous plastic, that have the ability or sufficient tensile strength to tolerate pulling of the rollers and tightly winding around the rollers, without tearing.

Figure 7:
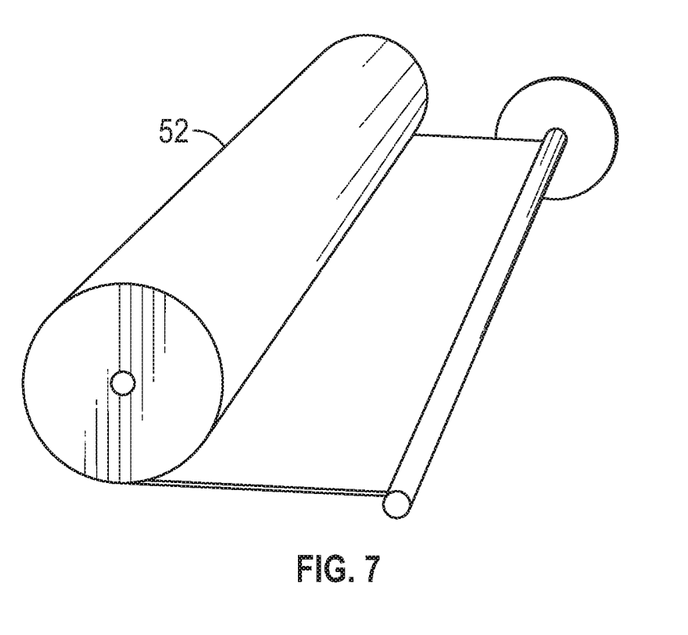
FIG. 7 provides an alternative embodiment of a receiving roller containing a roll of filter material of the present invention, without a battery in the roller.
Figure 8:
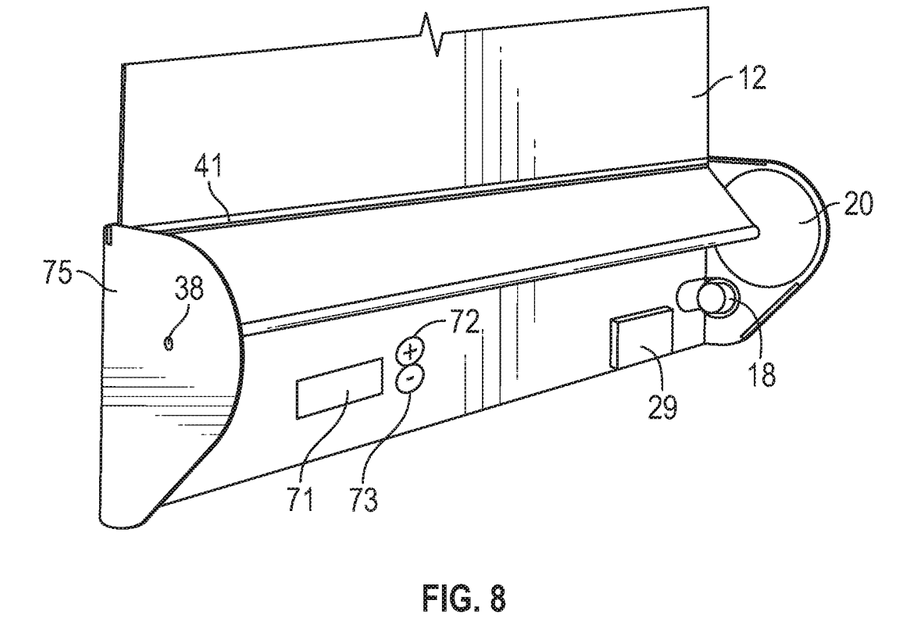
FIG. 8 provides an alternative embodiment of a housing for a receiving roller of an alternative embodiment of the air filter of the present invention, particularly suited for hard wiring instead of for use with a battery.
Figure 9:
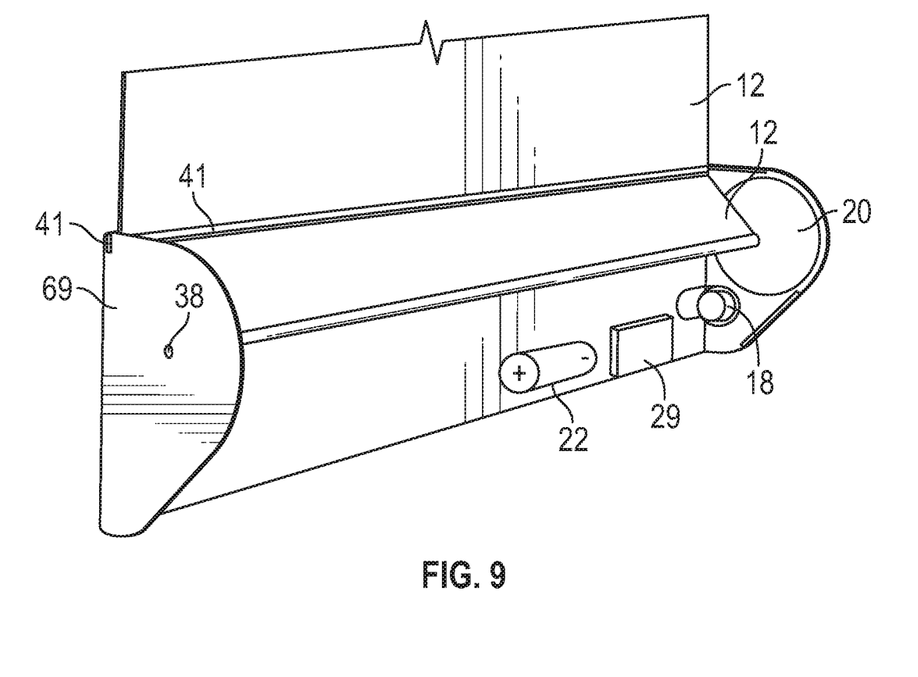
FIG. 9 provides still another alternative embodiment of a housing for a receiving roller of another alternative embodiment of the present invention, useable with a removable and/or rechargeable battery positioned in the housing apart from the dispensing roller.

The filter material comprises a roll 11 for use in the filter of the invention and in some embodiments is provided in a cartridge. That is, a first filter cartridge of the invention has a roll 11 of filter material 12 wound on a dispensing roller 23 attached by pins 38 at both ends through holes in the housing 14. A second filter cartridge of the invention has a receiving roller 13 attached by pins 38 at both ends 61 and 62 through holes 31 in the housing 16. Pins 38 hold the rollers in place during scrolling. As discussed above, in one embodiment, roller 13 houses one or more batteries generally within a hollowed out interior portion of that roller 13. Batteries are selected that can power the scrolling for the life of the filter length. The power needed is determined by the power consumption of the computer or control chip, the motor (resistance of scrolling or spooling over a certain amount of time), and an LED indicator/digital signal. In one embodiment, putting the computer or control chip on sleep regularly reduces the power required. In one usually less preferred embodiment, generally illustrated in FIG. 8, the computer or control chip has power ports so that the electronics and motor of the filter of the invention can be hard wired to a nearby electrical box (e.g., the power source for the HVAC system). In this embodiment, a roller with one or more batteries is not needed and a roller such as shown in FIG. 7 may be used instead. In still another embodiment, a rechargeable battery is provided to be installed in the roller housing as shown in FIG. 9, rather than a disposable battery within the receiving roller, and the rechargeable battery can be recharged on a periodic basis, preferably before replacing roll 11, and preferably such battery will remain charged for at least the period of time for full and complete use of the new roll 11.

While preferred embodiments of the present disclosure have been described, it should be understood that various changes, adaptations and modifications can be made therein without departing from the spirit of the invention(s) as claimed below.

I claim:

1. A disposable, automatically scrolling air filter for an HVAC system having at least one air intake vent or other air intake opening, to replace a common box-type filter at the front of said intake vent or other air intake opening where air enters the vent, the common location of said box-type filter, without having to alter the HVAC system and without having to cut or enter any HVAC system ducts for installation of said filter comprising:
   a roll of filter material having a height or width dimension at least as large as the greater of the height or width dimension of the air intake vent or opening;
   a dispensing roller for holding and dispensing the filter material;
   a receiving roller for receiving or collecting the filter material;
   a power source;
   a motor for turning or rotating the receiving roller; and
   a controller;
   wherein the dispensing roller and the receiving roller are installed for use with the HVAC system by respective independent attachment on opposing sides of the air intake vent or other air intake opening of the HVAC system, such that the space between the dispensing roller and the receiving roller overlies the front of the air intake vent or other air intake opening of the HVAC system where air enters the air intake vent, and such that the dispensing roller is spaced apart from, parallel to, and opposite of, but not directly connected to, the receiving roller;
   wherein the roll of filter material is rolled or wound around the dispensing roller with an outer end of the filter material capable of unrolling or unwinding from the dispensing roller and spanning or extending across the space between the dispensing roller and the receiving roller and connecting to the receiving roller for rolling or winding around the receiving roller, such that unwinding of the roll from the dispensing roller corresponds to winding of the roll on the receiving roller, thereby indirectly but not directly connecting the dispensing roller and the receiving roller;
   wherein the filter material that will span or extend across the space between the dispensing roller and the receiving roller will fully cover the air intake vent or other air intake opening of the HVAC system and filter air entering the air intake vent or other air intake opening;
   wherein the power source is associated with the motor which is associated with the controller and the receiving roller which can cause the receiving roller to pull filter material from the dispensing roller so as to cause the filter material to scroll from the dispensing roller to the receiving roller thereby replenishing the filter material overlying the air intake vent or other air intake opening of the HVAC system; and
   wherein for use said filter does not require any alteration of the HVAC system and no HVAC system ducts are cut or entered for installation of said filter.

2. The air filter of claim 1 wherein the power source is at least one battery.

3. The air filter of claim 2 wherein the at least one battery is positioned in the interior of the receiving roller.

4. The air filter of claim 1 further comprising a first housing for the dispensing roller and a second housing for the receiving roller, wherein said first housing is not directly connected to said second housing and does not control the positioning or distance between the first housing and the second housing.

5. The air filter of claim 4 further comprising a vented or porous cover for the filter material overlying the space between the dispensing roller and the receiving roller.

6. The air filter of claim 4 further comprising first pins which hold the dispensing roller in the first housing and second pins which hold the receiving roller in the second housing.

7. The air filter of claim 6 wherein the first and second pins transfer power from the power source to the controller.

8. The air filter of claim 6 wherein the controller comprises computer electronics.

9. The air filter of claim 1 wherein the power source transfers power to the motor and to the controller.

10. The air filter of claim 1 wherein the controller comprises a timer and causes the motor to activate scrolling of the filter material between the dispensing and receiving rollers on a pre-set time schedule.

11. The air filter of claim 1 wherein the controller comprises a sensor and causes the motor to activate scrolling of the filter material between the dispensing and receiving rollers when the filter material overlying the air intake vent or other opening is at least partially clogged with particles in air coming from the air intake vent.

12. The air filter of claim 1 wherein the controller comprises a manual activator and causes the motor to activate scrolling of the filter material between the dispensing and receiving rollers whenever the manual activator is activated.

13. The air filter of claim 1 wherein the controller comprises a wireless transmitter/receiver for wireless communications and/or operation.

14. The air filter of claim 13 wherein the wireless communications are through RF (Radio Frequency).

15. The air filter of claim 1 wherein the controller is a computer or comprises computer electronics.

16. The air filter of claim 4 wherein the receiving roller and the second housing is replaced when the roll on the dispensing roller is spent.

17. A disposable, automatically scrolling air filter for an HVAC system having at least one air intake vent, to replace a common box-type filter at the front of said intake vent or other air intake opening where air enters the vent, the common location of said box-type filter, without having to alter the HVAC system and without having to cut or enter any HVAC system ducts for installation of said filter, comprising:
   a roll of filter material having a height or width dimension at least as large as the greater of the height or width dimension of the air intake vent;
   a replaceable dispensing roller for holding and dispensing the filter material;
   a first housing for the dispensing roller;
   a replaceable receiving roller for receiving or collecting the filter material; a second housing for the receiving roller, wherein said first housing is not directly connected to said second housing;

a motor for turning or rotating the receiving roller;

a controller comprising computer electronics including a wireless technology control chip for data exchange and internet communications and a wireless transmitter/receiver for wireless communications and/or operation;

a power source comprising at least one battery positioned in the interior of the receiving roller for powering the motor and the controller;

first pins for holding the dispensing roller in the first housing and second pins for holding the receiving roller in the second housing, and wherein said first and second pins transfer power from the power source to the controller;

wherein the dispensing roller and the receiving roller are installed for use with the HVAC system by respective independent attachment on opposing sides of an air intake vent of the HVAC system, such that the space between the dispensing roller and the receiving roller overlies the front of the air intake vent of the HVAC system, and such that the dispensing roller is spaced apart from, parallel to, and opposite of, but not directly connected to, the receiving roller, without need to remove the air intake vent;

wherein the roll of filter material is rolled or wound around the dispensing roller with an outer end of the filter material capable of unrolling or unwinding from the dispensing roller and spanning or extending across the space between the dispensing roller and the receiving roller and connecting to the receiving roller for rolling or winding around the receiving roller, such that unwinding of the roll from the dispensing roller corresponds to winding of the roll on the receiving roller, thereby indirectly but not directly connecting the dispensing roller and the receiving roller;

wherein the filter material that will span or extend across the space between the dispensing roller and the receiving roller will fully cover the air intake vent of the HVAC system where said filter material filters air entering the air intake vent; and wherein the power source is associated with the motor which is associated with the controller and the receiving roller which can cause the receiving roller to pull filter material from the dispensing roller so as to cause the filter material to scroll from the dispensing roller to the receiving roller thereby replenishing the filter material overlying the air intake vent of the HVAC system; and wherein for use said filter does not require any alteration of the HVAC system and no HVAC system ducts are cut or entered for installation of said filter.

18. The air filter of claim 17 wherein the controller further comprises:

a timer, which causes the motor to activate scrolling of the filter material between the dispensing and receiving rollers on a pre-set time schedule;

a sensor, causes the motor to activate scrolling of the filter material between the dispensing and receiving rollers when the filter material overlying the air intake is at least partially clogged with particles in air coming from the air intake vent; and a a manual activator, which causes the motor to activate scrolling of the filter material between the dispensing and receiving rollers whenever the manual activator is activated.

19. The air filter of claim 17 further comprising a vented or porous cover for the filter material overlying the space between the dispensing roller and the receiving roller and mechanical or magnet guides for guiding the filter material from the dispensing roller to the receiving roller.

20. The air filter of claim 19, wherein when said air intake vent is not removed, said vented or porous cover for the filter material presses said filter material overlying the space between the dispensing roller and the receiving roller against said air intake vent.

* * * * *